United States Patent
Jitkoff et al.

(10) Patent No.: US 8,769,435 B1
(45) Date of Patent: *Jul. 1, 2014

(54) SYSTEMS AND METHODS FOR RESIZING AN ICON

(75) Inventors: John Nicholas Jitkoff, Palo Alto, CA (US); Alex Neely Ainslie, San Francisco, CA (US)

(73) Assignee: Google Inc., Mountain View, CA (US)

( * ) Notice: Subject to any disclaimer, the term of this patent is extended or adjusted under 35 U.S.C. 154(b) by 153 days.

This patent is subject to a terminal disclaimer.

(21) Appl. No.: 13/235,262

(22) Filed: Sep. 16, 2011

(51) Int. Cl.
*G06F 3/048* (2013.01)
*G09G 5/00* (2006.01)
*G06K 9/32* (2006.01)

(52) U.S. Cl.
USPC ........... 715/838; 715/800; 715/815; 345/660; 382/298

(58) Field of Classification Search
USPC .................. 715/800, 763, 815, 838
See application file for complete search history.

(56) References Cited

U.S. PATENT DOCUMENTS

| | | | |
|---|---|---|---|
| 5,479,602 A * | 12/1995 | Baecker et al. | 715/838 |
| 5,719,951 A * | 2/1998 | Shackleton et al. | 382/118 |
| 6,750,888 B1 * | 6/2004 | Nakagawa | 715/800 |
| 6,983,424 B1 * | 1/2006 | Dutta | 715/800 |
| 8,223,165 B1 * | 7/2012 | Jitkoff et al. | 345/592 |
| 2001/0020950 A1 * | 9/2001 | Shimizu et al. | 345/611 |
| 2002/0051007 A1 * | 5/2002 | Kitagawa et al. | 345/660 |
| 2004/0021643 A1 | 2/2004 | Hoshino et al. | |
| 2005/0251758 A1 * | 11/2005 | Cummins et al. | 715/838 |
| 2007/0124700 A1 | 5/2007 | Koivisto et al. | |
| 2007/0209022 A1 * | 9/2007 | Gourdol et al. | 715/815 |
| 2010/0050120 A1 | 2/2010 | Ohazama et al. | |
| 2010/0100849 A1 | 4/2010 | Fram | |
| 2010/0179991 A1 | 7/2010 | Lorch et al. | |
| 2010/0318573 A1 | 12/2010 | Yoshikoshi | |
| 2011/0055007 A1 | 3/2011 | Kitagawa et al. | |
| 2011/0057039 A1 | 3/2011 | Wang | |

* cited by examiner

*Primary Examiner* — Weilun Lo
*Assistant Examiner* — Dino Kujundzic
(74) *Attorney, Agent, or Firm* — McDermott Will & Emery LLP

(57) ABSTRACT

Systems and methods for resizing an icon are disclosed according to various aspects of the subject technology. In one aspect, a computer-implemented method for resizing an icon is disclosed. The method comprises computing an area of the icon, comparing the computed area of the icon with a predetermined area, and resizing the icon based on the comparison such that an area of the resized icon is approximately equal to the predetermined area.

24 Claims, 6 Drawing Sheets

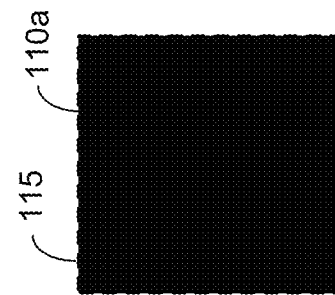
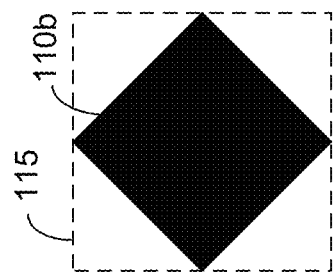
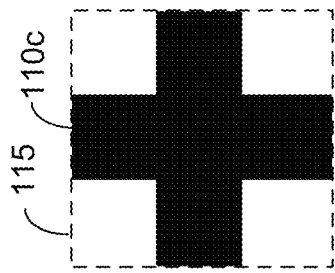
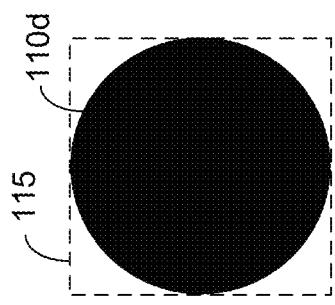
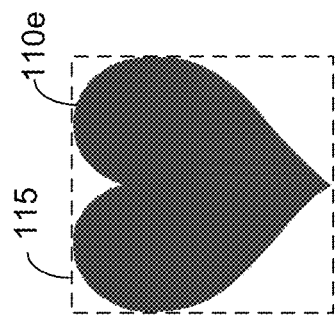
FIG. 1
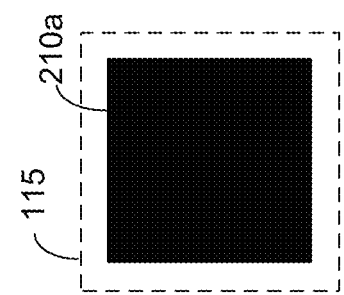
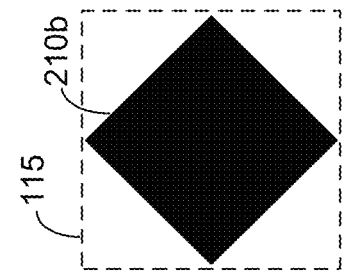
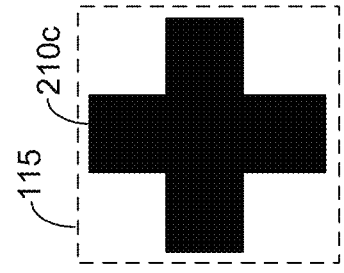
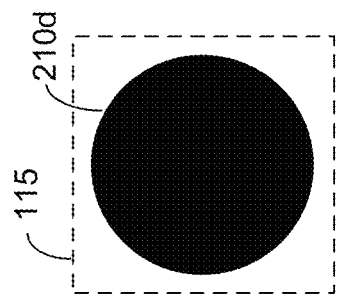
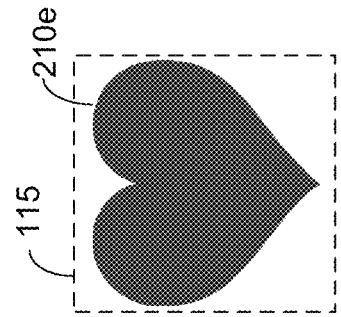
FIG. 2

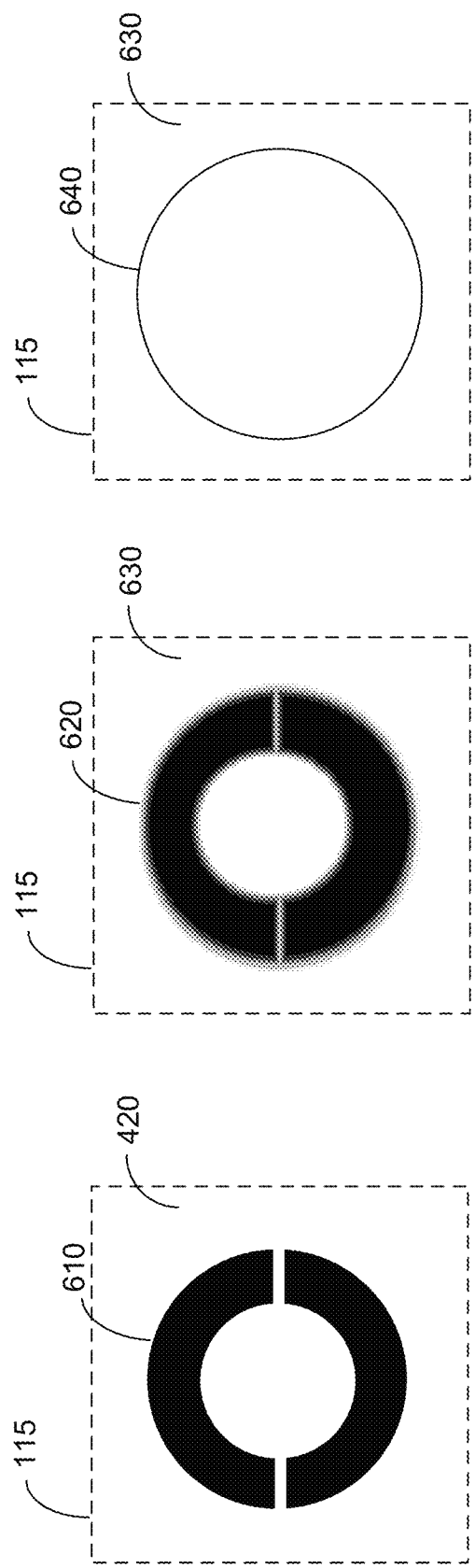

SYSTEMS AND METHODS FOR RESIZING AN ICON

FIELD

The subject disclosure generally relates to icons, and, in particular, to systems and methods for resizing an icon.

BACKGROUND

Icons may be displayed on a computing device to represent different applications, tabs, and/or other features that a user can open (e.g., by double clicking on the corresponding icon). The computing device may include a laptop computer, a desktop computer, a tablet, a smart phone or other computing device. The user may click on an icon using a mouse, a track pad or a touch screen. Icons may have a variety of different shapes. However, allowing icons to have different shapes may result in a variation in the visual weights of the icons.

SUMMARY

A computer-implemented method for resizing an icon is disclosed according to an aspect of the subject technology. The method comprises computing an area of the icon, comparing the computed area of the icon with a predetermined area, and resizing the icon based on the comparison such that an area of the resized icon is approximately equal to the predetermined area.

A system for resizing a plurality of icons is disclosed according to an aspect of the subject technology. The system comprises one or more processors and a machine-readable medium comprising instructions stored therein, which when executed by the one or more processors, cause the one or more processors to perform operations. For each of the plurality of icons, the operations comprise computing an area of the icon, comparing the computed area of the icon with a predetermined area, and resizing the icon based on the comparison such that an area of the resized icon is approximately equal to the predetermined area.

A machine-readable medium is disclosed according to an aspect of the subject technology. The machine-readable medium comprises instructions stored therein, which when executed by a machine, cause the machine to perform operations. The operations comprises computing a number of pixels in an icon, comparing the computed number of pixels in the icon with a predetermined number of pixels, and resizing the icon based on the comparison such that a number of pixels in the resized icon is approximately equal to the predetermined number of pixels.

A computer-implemented method for analyzing an icon is disclosed according to an aspect of the subject technology. The method comprises computing an area of the icon, comparing the computed area of the icon with a predetermined area, determining whether the icon is to be resized based on the comparison, and transmitting a message indicating the determination.

A system for analyzing an icon is disclosed according to an aspect of the subject technology. The system comprises one or more processors, and a machine-readable medium comprising instructions stored therein, which when executed by the one or more processors, cause the one or more processors to perform operations. The operations comprise receiving an icon from a remote system, computing an area of the icon, comparing the computed area of the icon with a predetermined area, and determining whether the icon is to be resized based on the comparison. The method also comprises transmitting a message to the remote system over a network connection, wherein the message indicates the determination.

A machine-readable medium is disclosed according to an aspect of the subject technology. The machine-readable medium comprises instructions stored therein, which when executed by a machine, cause the machine to perform operations. The operations comprise computing a number of pixels in the icon, comparing the number of pixels in the icon with a predetermined number of pixels, determining whether the icon is to be resized based on the comparison, and transmitting a message indicating the determination.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

FIG. 1 shows an example of a plurality of icons.

FIG. 2 shows a plurality of resized icons corresponding to the icons shown in FIG. 1 according to an aspect of the subject technology.

FIG. 6A shows an example of an icon according to an aspect of the subject technology.

FIG. 6B shows an example in which the icon in FIG. 6A is blurred according to an aspect of the subject technology.

FIG. 6C shows an outer boundary of the blurred icon shown in FIG. 6B according to an aspect of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Icons may be displayed on a computing device to represent different applications, tabs, and/or other features that a user can open (e.g., by clicking on the corresponding icon). Icons may have a variety of different shapes. However, allowing icons to have different shapes may result in a variation in the visual weights of the icons.

FIG. 1 shows an example of icons 110a-110e with various shapes, in which the available space 115 for each icon is the same (e.g., 128×128 pixels). In this example, the size of each icon 110a-110e is maximized within the available space 115, which results in the icons 110a-110e having different visual weights depending on their shapes. For example, the square-shaped icon 110a fills the entire available space 115, and therefore has a larger visual weight than each of the other icons 110b-110e. As a result, the user may perceive the square-shaped icon 110a as being larger than each of the other icons 110b-110e.

To address this problem, systems and methods according to various aspects of the subject technology may resize an icon so that the resized icon has a similar visual weight as other icons. In one aspect, the subject technology may resize one or more icons so that the area of each resized icon is approximately equal to a predetermined area. As a result, each resized icon occupies approximately the same area and therefore has approximately the same visual weight.

Figure 3:
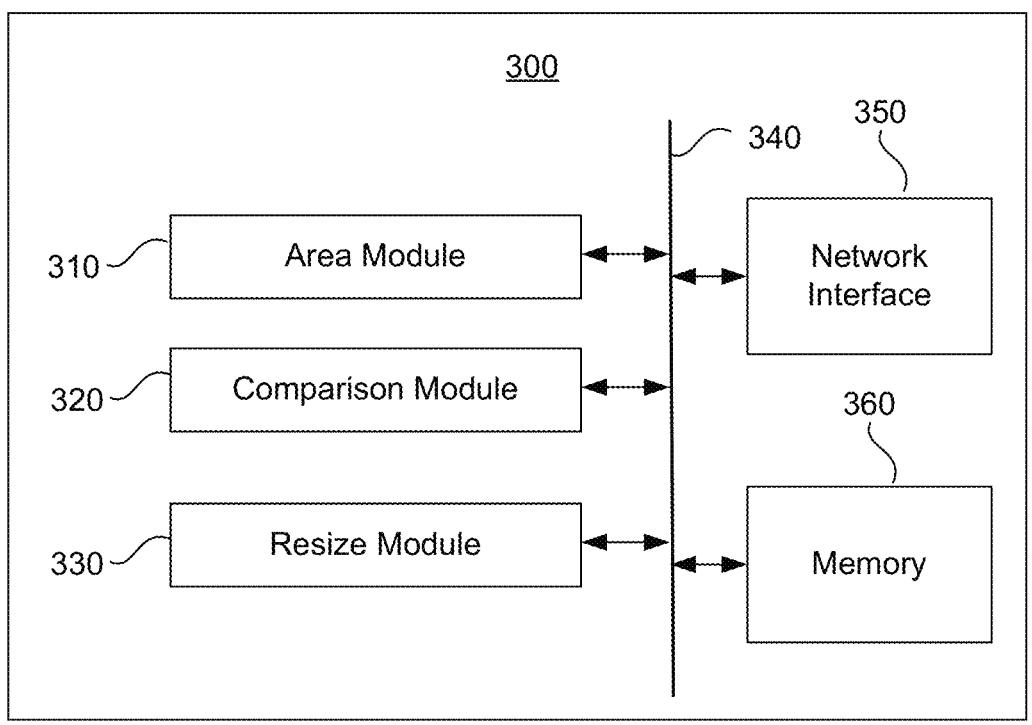
FIG. 3 shows a conceptual block diagram of a system according to an aspect of the subject technology.

FIG. 3 shows a system 300 for resizing an icon according to an aspect of the subject technology. The system 300 includes an area module 310, a comparison module 320, and a resize module 330. The modules may communication with one another via a bus 340 or other communication structure. The system 300 may also include a network interface 350 that allows one or more of the modules to communicate with a server and/or a computing device over a network connection (e.g., via a local area network (LAN), a wide area network (WAN), the Internet or other network). The system 300 may also include a memory 360, which may be shared by the modules and used to pass information between the modules. The modules may be implemented as a set of computer-readable instructions that are stored in a memory (e.g., memory 360) and executed by one or more processors to perform the various processes described herein.

In one aspect the area module 310 may be configured to receive an icon and compute an area of the icon. The area module 310 may compute the area of the icon using a variety of different techniques, examples of which are discussed further below.

The comparison module 320 is configured to compare the computed area of the icon with a predetermined area. The resize module 330 is configured to resize the icon based on the comparison such that the area of the resized icon is approximately equal to the predetermined area. For example, if the computed area of the icon is greater than the predetermined area, then the resize module 330 may reduce the size of the icon so that the area of the resized icon is approximately equal to the predetermined area. Conversely, if the computed area of the icon is less than the predetermined area, then the resize module 330 may increase the size of the icon so that the area of the resized icon is approximately equal to the predetermined area.

In one aspect, the resize module 330 may resize (e.g., scale) the icon by an amount that is proportional to a difference between the computed area of the icon and the predetermined area and/or a ratio of the computed area of the icon to the predetermined area. The difference or ratio may be determined by the comparison module 320.

In one aspect, the resize module 330 may resize the icon in an iterative process, in which the icon may be resized over several iterations until the area of the resized icon approximately equals the predetermined area. In each iteration, the area of the resized icon may be computed by the area module 310 and compared with the predetermined area by the comparison module 320. If the area of the resized icon is approximately equal to the predetermined area (e.g., within 5% or less of the predetermined area), then the resize module 330 may stop resizing the icon. If not, then the resize module 330 may further resize the icon based on the most recent comparison. The modules 310-330 may then repeat the above steps for the further resized icon in the next iteration.

The system 300 may be used to resize each one of a plurality of icons so that the area of each resized icon is approximately the same (approximately equal to the predetermined area) and each resized icon has approximately the same visual weight. After resizing an icon, the resize module 330 may store the resized icon in the memory 360 and/or send the resized icon to a remote computing device over a network connection via the network interface 350.

FIG. 2 shows an example in which the icons 110a-110e illustrated in FIG. 1 have been resized to corresponding icons 210a-210e according to an aspect of the subject technology. In this example, the icons 110a-110e have been resized such that the area of each resized icon 210a-210e is approximately equal to a predetermined area. As a result, the resized icons 210a-210e have consistent visual weights.

Techniques for resizing an icon will now be discussed according to various aspects of the subject technology.

Figure 4:
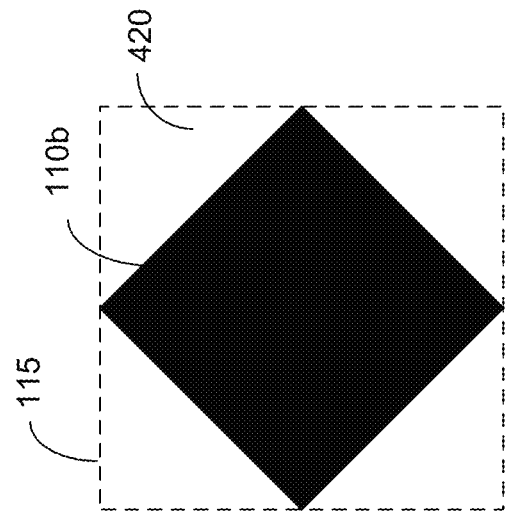
FIG. 4 shows an example of an icon.

FIG. 4 shows an example of an icon 110b within an available space 115 (e.g., 128×128 pixels) for the icon 110b. In this example, the icon 110b may be embedded in an image having dimensions equal to the available space 115 (e.g., 128×128 pixels). The image may be stored as a bitmap file or other type of image file. In this example, the area 420 within the available space 115 that is located outside of the icon 110b may comprise transparent pixels and/or white pixels. Thus, the image may comprise a full set of available pixels (e.g., 128×128 pixels), while the icon comprises a subset of the available pixels (e.g., 65×65 pixels). In the example shown in FIG. 4, the icon 110b comprises human-perceivable pixels (non-white, non-transparent pixels) surrounded by white and/or transparent pixels filing the remaining portion of the image.

In one aspect, the area module 310 may compute the area of the icon 110b by determining the number of non-transparent and/or non-white pixels in the image. In this aspect, the area of the icon 110b may be represented by a number of pixels equal to the number of non-transparent and/or non-white pixels in the image and the predetermined area may be represented by a predetermined number of pixels (e.g., 61 percent of the total number of pixels in the image).

After determining the number of pixels in the icon 110b, the comparison module 320 may compare the number of pixels in the icon 110b with the predetermined number of pixels, and the resize module 330 may resize the icon 110b based on the comparison so that the number of pixels in the resized icon is approximately equal to the predetermined number of pixels. Although the icon 110b is shown having one color in this example for ease of illustration, it is to be appreciated that the icon 110b may comprise multiple colors.

After the icon 110b is resized, the resize module 330 may generate an image having dimensions equal to the available space 115 (e.g., 128×128 pixels) and including the resized icon therein. In this example, the resize module 330 may make the remaining pixels in the image transparent and/or white. The resulting image may be stored as an image file (e.g., bitmap file). The resized icon may then be stored in the memory 360 by storing the image file in the memory 360 and/or the resized icon may be transmitted over a network connection by transmitting the image file over the network connection.

Figure 5B:
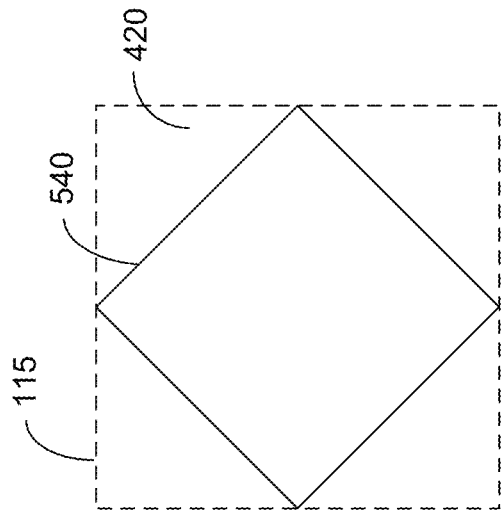
FIG. 5B shows an outer boundary of the icon shown in FIG. 5A according to an aspect of the subject technology.
Figure 5A:
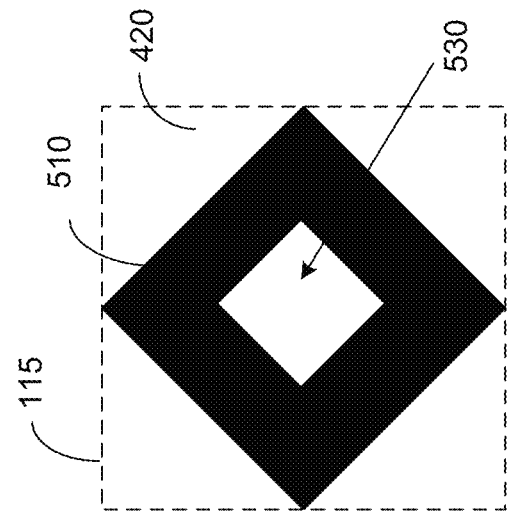
FIG. 5A shows an example of an icon including an enclosed area comprising transparent and/or white pixels according to an aspect of the subject technology.

FIG. 5A shows an example of an icon 510 within an available space 115 (e.g., 128×128 pixels) for the icon 510. In this example, the icon 510 is similar to the icon 110b in FIG. 4, except that the icon 510 includes an enclosed area 530 comprising transparent and/or white pixels. Although this area 530 comprises transparent and/or white pixels, this area 530 may contribute to the visual weight of the icon 510. Therefore, it may be desirable to include this area 530 in the computed area of the icon 510.

In one aspect, the area module 310 may compute the area of the icon 510 by determining an outer boundary of the icon 510. For example, the area module 310 may determine the outer boundary of the icon 510 using a convex hull algorithm. The convex hull algorithm determines a minimum continuous boundary that contains (i.e., encloses) all of the non-transparent pixels and/or non-white pixels in the image. In another example, the area module 310 may determine the outer boundary of the icon 510 using an edge-detection algorithm. The edge-detection algorithm detects the outer edge, and hence the outer boundary of the icon 510, by detecting sharp transitions in pixel values between pixels in the outer boundary of the icon 510 and adjacent transparent and/or white pixels surrounding the icon 510. The area module 510 may employ other techniques to determine the outer boundary of the icon. FIG. 5B shows an example of the outer boundary 540 of the icon 510.

After the outer boundary 540 is determined, the area module 310 may compute the area of the icon 510 by determining the number of pixels enclosed by the outer boundary of the icon 510. Thus, in this aspect, the area module 310 includes the area 530 in the computed area of the icon 510.

After determining the number of pixels in the icon 510, the comparison module 520 may compare the number of pixels in the icon 510 with the predetermined number of pixels, and the resize module 330 may resize the icon 510 such that the number of pixels in the resized icon is approximately equal to the predetermined number of pixels. As discussed above, the resize module 330 may store the resized icon in an image file.

FIG. 6A shows an example of an icon 610 within an available space 115 (e.g., 128×128 pixels) for the icon 610. In this example, the icon 610 does not have a continuous outer boundary.

In one aspect, the area module 310 may first blur the icon 610 using a blurring algorithm. For example, the blurring algorithm may comprise a mean filter. For each pixel, the mean filter may average the values of pixels located within a small window surrounding the pixel and assign the averaged value to the pixel. The dimensions of the window may be an adjustable parameter of the mean filter. In another example, the blurring algorithm may comprise a Gaussian blurring algorithm. The area module 310 may blur the icon 610 to create a continuous outer boundary. FIG. 6B shows an example in which the icon 610 in FIG. 6A is blurred resulting in the blurred icon 620. As shown in FIG. 6B, the blurred icon 620 has a continuous outer boundary surrounded by transparent and/or white pixels in the area 630.

In this aspect, the area module 310 may compute the area of the blurred icon 620. In one aspect, the area of the blurred icon 620 may be represented by the number of pixels in the blurred icon 620. For example, the area module 310 may determine the number of pixels in the blurred icon 620 by starting at the edges of the available space 115 for the icon and subtracting, from the total number of pixels in the available space 115, the transparent pixels and/or white pixels surrounding the blurred icon 620. In another example, the area module 310 may compute the outer boundary of the blurred icon 620 using any of the techniques described above or other technique. After the outer boundary of the blurred icon is determined, the area module 310 may determine the total number of pixels enclosed by the outer boundary of the blurred icon. FIG. 6C shows an example of the outer boundary 640 of the blurred icon 620.

After determining the number of pixels in the blurred icon 620, the comparison module 320 may compare the number of pixels in the blurred icon with the predetermined number of pixels. The resize module 330 may then resize the blurred icon 620 based on the comparison such that the number of pixels in the blurred icon is approximately equal to the predetermined number of pixels. The resize module 330 may then resize the un-blurred icon 610 by the same amount and output the resized un-blurred icon as the resized icon. In another example, the resize module 330 may resize (e.g., scale) the un-blurred icon by an amount that is proportional to a difference between the number of pixels in the blurred icon and the predetermined number of pixels and/or a ratio of the number of pixels in the blurred icon to the predetermined number of pixels.

In one aspect, the area module 310 may be capable of computing an area of an icon using any one of the techniques described above. In this aspect, the technique used by the area module 310 may be determined by a setting set by a user.

In one aspect, the area of an icon may be represented by a ratio of the number of pixels in the icon to the total number of pixels in the available space 115. Similarly, the predetermined area may be represented by a ratio of a desired number of pixels to the total number of pixels in the available space for the icon (e.g., 61 percent). In this aspect, the resize module 330 may resize the icon such that the ratio for the icon is approximately equal to the ratio for the predetermined number of pixels.

After the system 300 resizes an icon, the resized icon may be used instead of the original icon to represent a corresponding application, website and/or file. For example, a computing device may display the resized icon within an address bar, a tab or a bookmark of a web browser to represent a corresponding website. In another example, the computing device may display the resized icon on a desktop and/or window to represent a corresponding application, website and/or file.

In one aspect, the system 300 may reside on a computing device. In this aspect, when the computing device receives an icon representing an application, website and/or file, the system 300 may resize the received icon. The computing device may then display the resized icon instead of the originally received icon to the user to represent the corresponding application, website and/or file.

In another aspect, the system 300 may reside on a server. In this aspect, the server may receive an icon from a computing device over a network connection. When the server receives the icon, the system 300 may resize the received icon and send the resized icon to the computing device over the network connection via the network interface 350. The computing device may then use the resized icon to represent the corresponding application, website and/or file to the user. As discussed above, the resized icon may be sent to the computing device in an image file, which may include the resized icon and transparent and/or white pixels surrounding the resized icon.

In another aspect, the server may receive the icon from a creator of the icon. For example, for an icon representing an application, the server may receive the icon from the developer of the application. In another example, for an icon representing a website, the server may retrieve the icon may using a link provided by the website. In this aspect, the server may communicate with the creator of the icon over a network connection to a computing device and/or server operated by the creator of the icon.

For the example of an application, when the server receives the icon, the system 300 may resize the icon and send the resized icon back to the developer of the application over the network connection. The developer may then use the resized icon to represent the application and may include the resized icon with the application (e.g., when the application is downloaded to a computing device and/or written on a computer-readable media).

For the example of a website, when the server receives the icon, the system 300 may resize the icon and send the resized icon to the administrator of the website over the network connection. The administrator may store the resized icon in a memory and provide a computing device accessing the website with a link to the resized icon stored in the memory. The computing device may retrieve the resized icon using the link and display the resized icon to a user to represent the website.

In one aspect, instead of automatically resizing an icon, the comparison module 320 may compare the computed area of the icon with the predetermined area and determine whether the icon needs to be resized based on the comparison. If the area of the icon is approximately equal to the predetermined area, then the comparison module 320 may inform the creator of the icon that the icon is approved (e.g., by sending a message to the creator of the icon indicating that the icon is approved). Otherwise, the comparison module 320 may inform the creator of the icon that the icon needs to be resized based on the comparison, and rely on the creator to resize the icon accordingly. For example, if the computed area of the icon is greater than the predetermined area, then the comparison module 320 may send a message to the creator of the icon to reduce the size of the icon. If the computed area of the icon is less than the predetermined area, then the comparison module 320 may send a message to the creator of the icon to increase the size of the icon within the available space 115. The comparison module 320 may sends messages to the creator of the icon over a network connection via the network interface 350.

After the creator of the icon resizes the icon, the creator of the icon may resubmit the resized icon to the server. If the computed area of the resized icon is approximately equal to the predetermined area, then the comparison module 320 may approve the resized icon and inform the creator of the icon that the resized icon has been approved. Otherwise, the comparison module 320 may inform the creator that the icon needs to be resized again.

In one aspect, when a server receives an icon from a creator of the icon, the comparison module 320 may compare the computed area of the icon with the predetermined area to determine whether the icon needs to be resized. If the comparison module 320 determines that the icon needs to be reduced in sized, then the comparison module 320 may instruct the resize module 330 to resize the icon based on the comparison. On the other hand, if the comparison module 320 determines that the icon needs to be increased in size, then the comparison module 320 may send a message to the creator of the icon to increase the size of the icon. This is because, if the original icon is very small, then simply stretching the dimensions of the icon to increase the size of the icon may result in an icon that appears fussy and/or pixilated. In this case, the creator of the icon may increase the size of the icon by recreating a larger version of the icon.

Figure 7:
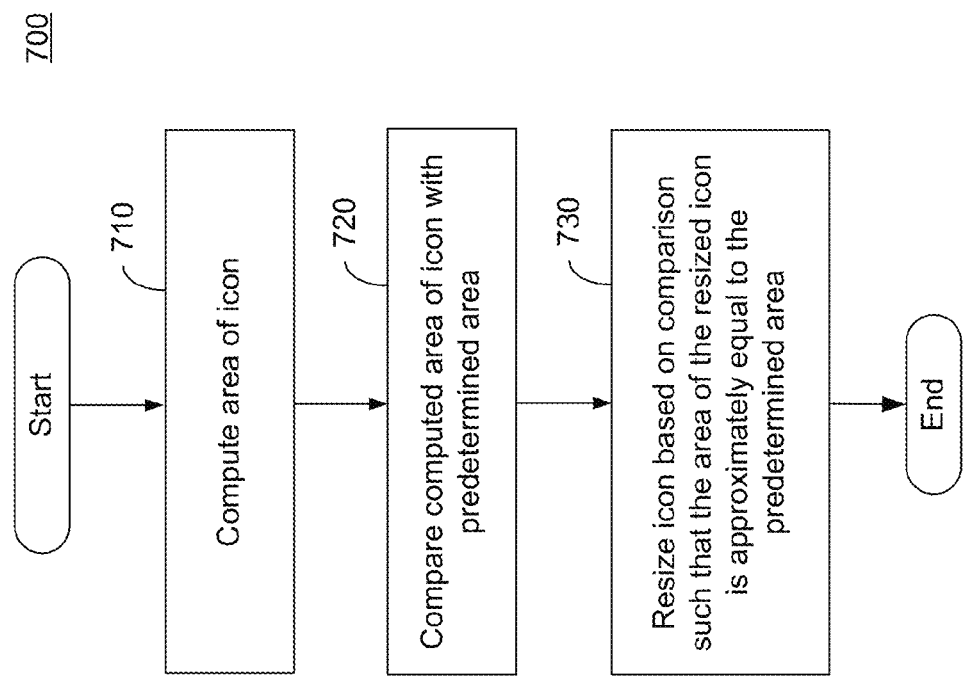
FIG. 7 shows a method for resizing an icon according to an aspect of the subject technology.

FIG. 7 shows a flowchart of a method 700 for resizing an icon according to an aspect of the subject technology. In step 710, an area of the icon is computed. The area of the icon may be computed using any one of the techniques discussed above or other technique.

In step 720, the computed area of the icon is compared with a predetermined area. In step 730, the icon is resized based on the comparison such that the area of the resized icon is approximately equal to the predetermined area. For example, if the computed area of the icon is greater than the predetermined area, then the icon may be reduced in size. Conversely, if the computed area of the icon is less than the predetermined area, then the icon may be increased in size.

The method 700 may be performed for each one of a plurality of icons so that the area of each resized icon is approximately the same (approximately equal to the predetermined area) and each resized icon has the approximately the same visual weight.

As discussed above, the area of the icon may be represented by a number of pixels in the icon. Similarly, the predetermined area may be represented by a predetermined number of pixels. In this case, the number of pixels in the icon is computed in step 710 and the number of pixels in the icon is compared with the predetermined number of pixels in step 720. The icon is then resized in step 730 such that the number of pixels in the resized icon is approximately equal to the predetermined number of pixels.

Figure 8:
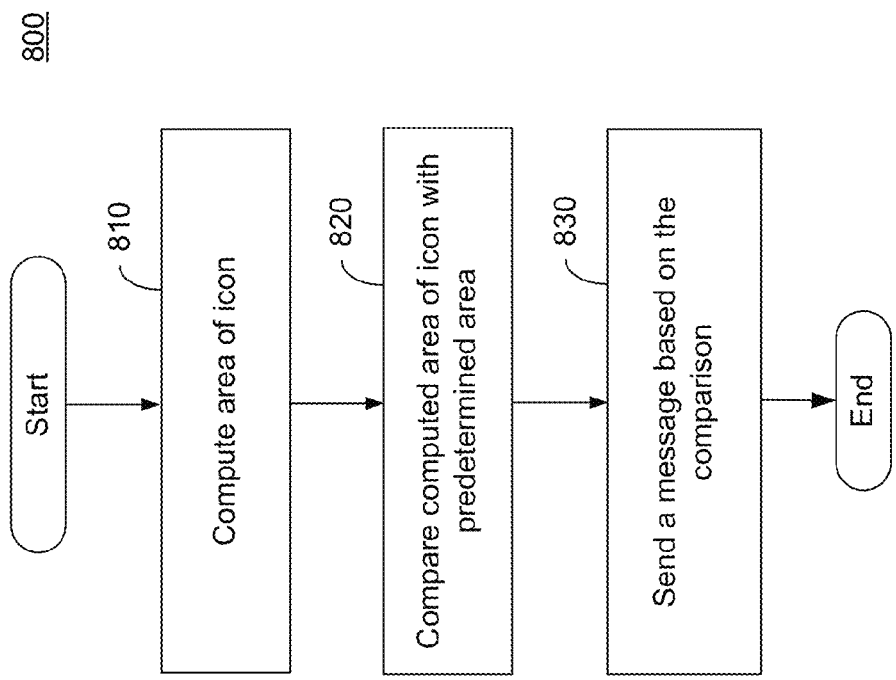
FIG. 8 shows a method for analyzing an icon according to an aspect of the subject technology.

FIG. 8 shows a flowchart of a method 800 for analyzing an icon according to an aspect of the subject technology. In step 810, an area of the icon is computed. The area of the icon may be computed using any one of the techniques discussed above or other technique.

In step 820, the computed area of the icon is compared with a predetermined area. In step 830, a message is sent (e.g., to the creator of the icon) based on the comparison. If the computed area of the icon is approximately equal to the predetermined area, then a message is sent indicating that the icon is approved. Otherwise, a message is sent indicating that the icon needs to be resized. For example, if the computed area of the icon is greater than the predetermined area, then the message indicates that the size of the icon needs to be reduced. Conversely, if the computed area of the icon is less than the predetermined area, then the message indicates that the size of the icon needs to be increased.

Figure 9:
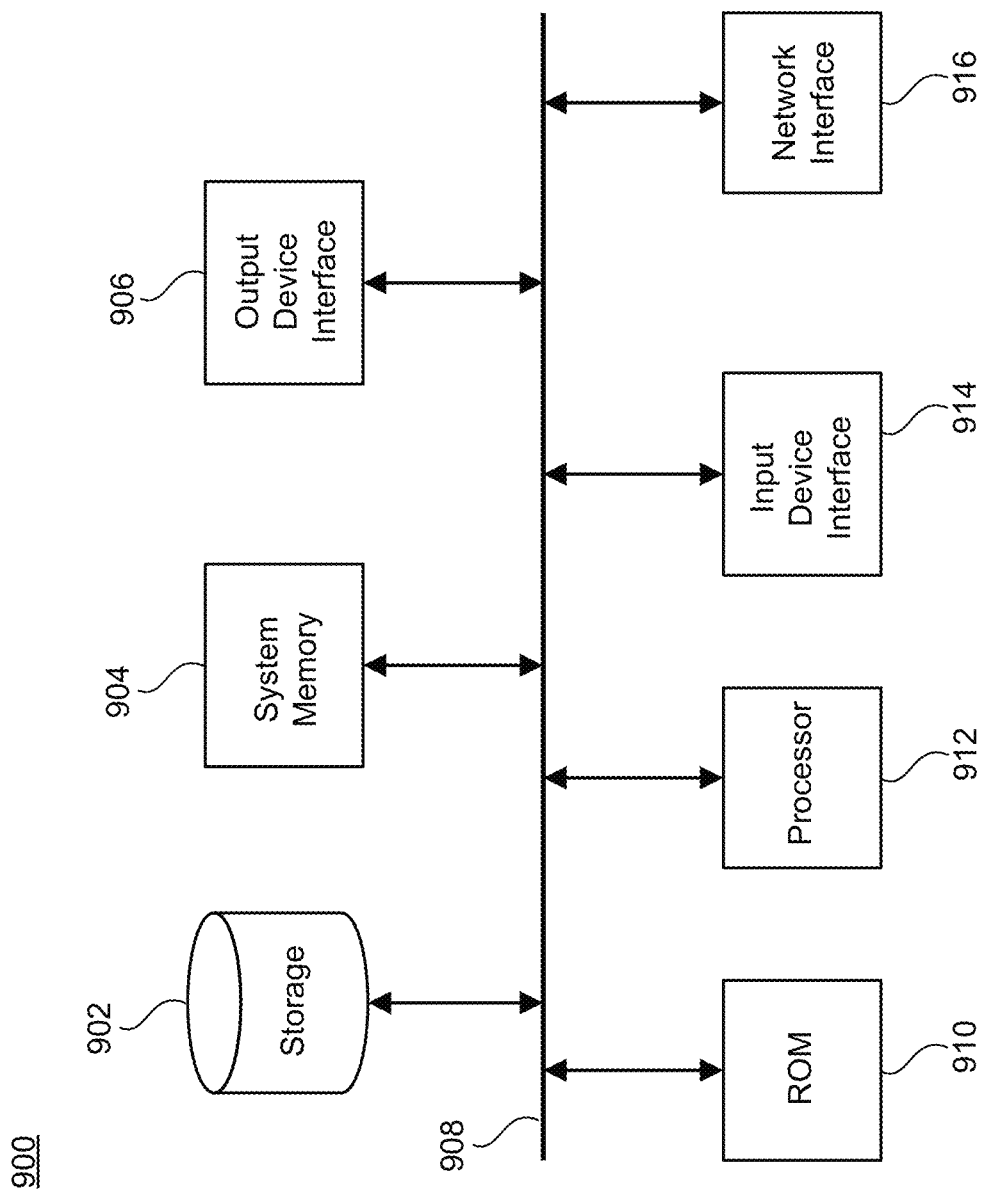
FIG. 9 conceptually illustrates an electronic system with which some implementations of the subject technology may be implemented.

FIG. 9 conceptually illustrates an electronic system with which some implementations of the subject technology may be implemented. For example, the electronic system may be used to implement the system 300 illustrated in FIG. 3. Electronic system 900 includes a bus 908, processing unit(s) 912, a system memory 904, a read-only memory (ROM) 910, a permanent storage device 902, an input device interface 914, an output device interface 906 and a network interface 916.

Bus 908 collectively represents all system, peripheral, and chipset buses that communicatively connect the numerous internal devices of electronic system 900. For instance, bus 908 communicatively connects processing unit(s) 912 with ROM 910, system memory 904, and permanent storage device 902.

From these various memory units, processing unit(s) 912 retrieves instructions to execute and data to process in order to execute the processes of the subject disclosure. For example, each module in the system 300 may include instructions that are stored in one or more of the memory units and executed by the processing unit(s) 912 to implement the processes of the module. The processing unit(s) can be a single processor or a multi-core processor in different implementations.

ROM 910 stores static data and instructions that are needed by processing unit(s) 912 and other modules of the electronic system. Permanent storage device 902, on the other hand, is a read-and-write memory device. This device is a non-volatile memory unit that stores instructions and data even when electronic system 900 is off. Some implementations of the subject disclosure use a mass-storage device (such as a magnetic or optical disk and its corresponding disk drive) as permanent storage device 902.

Other implementations use a removable storage device (such as a floppy disk, flash drive, and its corresponding disk drive) as permanent storage device 902. Like permanent storage device 902, system memory 904 is a read-and-write memory device. However, unlike storage device 902, system memory 904 is a volatile read-and-write memory, such as a random access memory. System memory 904 stores some of the instructions and data that the processor needs at runtime. In some implementations, the processes of the subject disclosure are stored in system memory 904, permanent storage device 902, and/or ROM 910. From these various memory units, processing unit(s) 912 retrieves instructions to execute and data to process in order to execute the processes of some implementations.

Bus 908 also connects to input and output device interfaces 914 and 906. Input device interface 914 enables the user to communicate information and select commands to the electronic system. Input devices used with input device interface 914 include, for example, alphanumeric keyboards and pointing devices (also called "cursor control devices"). Output device interfaces 906 enables, for example, the display of images generated by the electronic system 900. Output devices used with output device interface 906 include, for example, printers and display devices, such as cathode ray tubes (CRT) or liquid crystal displays (LCD).

Finally, as shown in FIG. 9, bus 908 also couples electronic system 900 to a network (not shown) through a network interface 916. In this manner, the electronic system 900 can be a part of a network of computers (such as a local area network ("LAN"), a wide area network ("WAN"), or an Intranet, or a network of networks, such as the Internet. Any or all components of electronic system 900 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for resizing an icon, the method comprising:
   determining an outer boundary of the icon;
   computing a number of pixels enclosed by the outer boundary of the icon;
   comparing the computed number of pixels with a predetermined number of pixels; and
   resizing the icon based on the comparison such that a number of pixels in the resized icon is approximately equal to the predetermined number of pixels, wherein the resized icon is disposed within an image, the image comprising transparent pixels or white pixels surrounding the resized icon.

2. The method of claim 1, wherein resizing the icon comprises increasing the icon in size when the computed number of pixels is less than the predetermined number of pixels.

3. The method of claim 2, wherein resizing the icon comprises decreasing the icon in size when the computed number of pixels is greater than the predetermined number of pixels.

4. The method of claim 1, wherein determining the outer boundary of the icon comprises applying a convex hull algorithm to an image comprising the icon.

5. The method of claim 1, further comprising generating an image comprising the resized icon and transparent pixels or white pixels surrounding the resized icon.

6. The method of claim 1, wherein the icon represents an application or a website, and the method further comprises displaying the resized icon to a user to represent the application or the website.

7. A computer-implemented method for resizing an icon, the method comprising:
   blurring the icon, wherein blurring the icon comprises applying a mean filter to the icon, wherein for each pixel the mean filter averages values of pixels located within a window surrounding the each pixel and assigns an averaged value to the each pixel;
   computing a number of pixels in the blurred icon;
   comparing the computed number of pixels with a predetermined number of pixels; and
   resizing the icon based on the comparison.

8. The method of claim 7, wherein blurring the icon comprises applying a Gaussian blurring algorithm to the icon.

9. The method of claim 7, wherein computing the number of pixels in the blurred icon comprises subtracting, from a total number of pixels in an available space for the icon, transparent pixels or white pixels surrounding the blurred icon.

10. The method of claim 7, wherein computing the number of pixels in the blurred icon comprises:
    determining an outer boundary of the blurred icon; and
    determining a number of pixels enclosed by the outer boundary of the blurred icon.

11. A system for resizing a plurality of icons, the system comprising:
    one or more processors; and
    a machine-readable medium comprising instructions stored therein, which when executed by the one or more processors, cause the one or more processors to perform operations comprising:
    for each of the plurality of icons, performing the steps of:
        determining an outer boundary of the icon;
        computing an area enclosed by the outer boundary of the icon;
        comparing the computed area with a predetermined area; and
        resizing the icon based on the comparison such that an area of the resized icon is approximately equal to the predetermined area, wherein the resized icon is disposed within an image, the image comprising transparent pixels or white pixels surrounding the resized icon.

12. A non-transitory machine-readable medium comprising instructions stored therein, which when executed by a machine, cause the machine to perform operations comprising:
    determining an outer boundary of an icon;
    computing an area enclosed by the outer boundary of the icon;
    comparing the computed area with a predetermined area;
    resizing the icon;
    resizing the icon based on the comparison such that an area of the resized icon is approximately equal to the predetermined area, wherein the resized icon is disposed within an image, the image comprising transparent pixels or white pixels surrounding the resized icon.

13. A non-transitory machine-readable medium comprising instructions stored therein, which when executed by a machine, cause the machine to perform operations comprising:
    blurring an icon, wherein blurring the icon comprises applying a mean filter to the icon, wherein for each pixel the mean filter averages values of pixels located within a window surrounding each pixel and assigns an averaged value to each pixel;
    computing an area of the blurred icon;
    comparing the computed area with a predetermined area; and
    resizing the icon based on the comparison.

14. The machine-readable medium of claim 12, wherein the icon represents an application or a website, and the operations further comprise displaying the resized icon to a user to represent the application or the website.

15. A computer-implemented method for analyzing an icon, comprising:
    computing an area of the icon;
    comparing the computed area of the icon with a predetermined area;
    transmitting a message indicating that the icon is to be increased in size when the computed area of the icon is less than the predetermined area; and
    reducing the icon in size when the computed area of the icon is greater than the predetermined area, wherein the resized icon is disposed within an image, the image comprising transparent pixels or white pixels surrounding the resized icon.

16. The method of claim 15, wherein transmitting the message comprises transmitting the message to a remote system via a local area network (LAN), a wide area network (WAN) or the Internet.

17. The method of claim 16, further comprising transmitting the reduced-size icon to the remote system when the computed area of the icon is greater than the predetermined area.

18. A system for analyzing an icon, the system comprising:
    one or more processors; and
    a machine-readable medium comprising instructions stored therein, which when executed by the one or more processors, cause the one or more processors to perform operations comprising:
    receiving an icon from a remote system;

blurring the icon, wherein blurring the icon comprises applying a mean filter to the icon, wherein for each pixel the mean filter averages values of pixels located within a window surrounding the each pixel and assigns an averaged value to the each pixel;

computing an area of the blurred icon;

comparing the computed area of the blurred icon with a predetermined area;

determining the icon is to be resized when the area of the blurred icon differs from the predetermined area; and transmitting a message to the remote system over a network connection when the icon is to be resized, wherein the message indicates the icon is to be resized.

19. The system of claim 18, wherein the network connection is via a local area network (LAN), a wide area network (WAN) or the Internet.

20. The system of claim 18, wherein determining the icon is to be resized comprises determining that the icon is to be increased in size when the computed area of the blurred icon is less than the predetermined area, and the message indicates that the icon needs to be increased in size.

21. The system of claim 18, wherein determining the icon is to be resized comprises determining that the icon is to be decreased in size when the computed area of the blurred icon is greater than the predetermined area, and the message indicates that the icon needs to be decreased in size.

22. A non-transitory machine-readable medium comprising instructions stored therein, which when executed by a machine, cause the machine to perform operations comprising:

blurring an icon, wherein blurring the icon comprises applying a mean filter to the icon, wherein for each pixel the mean filter averages values of pixels located within a window surrounding the each pixel and assigns an averaged value to the each pixel;

computing a number of pixels in the blurred icon;

comparing the number of pixels in the blurred icon with a predetermined number of pixels;

determining whether the icon is to be resized based on the comparison; and transmitting a message indicating the determination.

23. The machine-readable media of claim 22, wherein determining whether the icon is to be resized comprises determining that the icon is to be increased in size when the number of pixels in the blurred icon is less than the predetermined number of pixels, and the message indicates that the icon needs to be increased in size.

24. The machine-readable media of claim 22, wherein determining whether the icon is to be resized comprises determining that the icon is to be decreased in size when the number of pixels in the blurred icon is greater than the predetermined number of pixels, and the message indicates that the icon needs to be decreased in size.

* * * * *